United States Patent
Okawa

[11] Patent Number: 5,939,507
[45] Date of Patent: Aug. 17, 1999

[54] METHOD FOR MANUFACTURING SILOXANE COMPOUNDS

[75] Inventor: Tadashi Okawa, Chiba Prefecture, Japan

[73] Assignee: Dow Corning Toray Silicone Co., Ltd., Tokyo, Japan

[21] Appl. No.: 09/062,914

[22] Filed: Apr. 20, 1998

[30] Foreign Application Priority Data

Apr. 21, 1997 [JP] Japan .................................... 9-117573

[51] Int. Cl.$^6$ .................................................. C08G 77/06
[52] U.S. Cl. ................................. 528/12; 528/23; 556/469
[58] Field of Search .......................... 528/12, 23; 556/469

[56] References Cited

U.S. PATENT DOCUMENTS

| | | | |
|---|---|---|---|
| 5,169,909 | 12/1992 | Okawa | 525/478 |
| 5,338,817 | 8/1994 | Mine et al. | 528/12 |

FOREIGN PATENT DOCUMENTS 291871  11/1988  European Pat. Off. .

*Primary Examiner*—Melvyn I. Marquis
*Assistant Examiner*—Mark W. Milstead
*Attorney, Agent, or Firm*—Melvin D. Fletcher

[57] ABSTRACT

A method for manufacturing a siloxane compound described by formula $R^1{}_m Si\{OSi(CH_3)_2H\}_{(4-m)}$ comprising reacting a silane compound or condensation product of a silane compound described by formula $R^1{}_m Si(OR^2)_{(4-m)}$, where $R^1$ is selected from the group consisting of hydrogen and substituted or unsubstituted monovalent hydrocarbon groups, $R^2$ is hydrogen, alkyl groups and alkoxyalkyl groups, and m is an integer from 0 to 3, with 1,1,3,3-tetramethyldisiloxane in an aqueous solution of an acid in which the acid concentration is 1.0 wt % or less, and the molar ratio of the aqueous solution to the 1,1,3,3-tetramethyldisiloxane is in the range of 0.5 to 1.5. The method is particularly useful for manufacturing siloxane compounds having dimethylhydrodosiloxy groups.

10 Claims, No Drawings

METHOD FOR MANUFACTURING SILOXANE COMPOUNDS

BACKGROUND OF INVENTION

The present invention is a method for manufacturing a siloxane compound described by formula $R^1{}_m Si\{OSi(CH_3)_2 H\}_{(4-m)}$ comprising reacting a silane compound or condensation product of a silane compound described by formula $R^1{}_m Si(OR^2)_{(4-m)}$, where $R^1$ is selected from the group consisting of hydrogen and substituted or unsubstituted monovalent hydrocarbon groups, $R^2$ is selected from the group consisting of hydrogen, alkyl groups and alkoxyalkyl groups, and m is an integer from 0 to 3, with 1,1,3,3-tetramethyldisiloxane in an aqueous solution of an acid in which the acid concentration is 1.0 wt % or less, and the molar ratio of aqueous solution to the 1,1,3,3-tetramethyldisiloxane is in the range of 0.5 to 1.5. The method is particularly useful for manufacturing siloxane compounds having dimethylhydridosiloxy groups.

Japanese Patent Application Kokai No. 61-195129 and Japanese Patent Application Kokai No. 63-305133 propose methods for manufacturing siloxane compounds containing dimethylhydridosiloxy groups that can be described by general formula $R^1{}_m Si\{OSi(CH_3)_2 H\}_{(4-m)}$, where $R^1$ is a hydrogen atom or a substituted or unsubstituted monovalent hydrocarbon group, and m is an integer from 0 to 3. However, large amounts of water and hydrochloric acid must be used. Accordingly, the efficiency is extremely poor, thus these methods are not suited to mass production. Furthermore, since a high concentration of hydrochloric acid is used, the siloxane compounds which are the desired products undergo a dehydrogenation type condensation reaction with 1,1,3,3-tetramethyldisiloxane.

The object of the present invention is to provide a method for the efficient selective manufacture of siloxane compounds which have dimethylhydridosiloxy groups.

SUMMARY OF INVENTION

The present invention is a method for manufacturing a siloxane compound described by formula $R^1{}_m Si\{OSi(CH_3)_2 H\}_{(4-m)}$ comprising reacting a silane compound or condensation product of a silane compound described by formula $R^1{}_m Si(OR^2)_{(4-m)}$, where $R^1$ is selected from the group consisting of hydrogen and substituted or unsubstituted monovalent hydrocarbon groups, $R^2$ is selected from the group consisting of hydrogen, alkyl groups and alkoxyalkyl groups, and m is an integer from 0 to 3, with 1,1,3,3-tetramethyldisiloxane in an aqueous solution of an acid in which the acid concentration is 1.0 wt % or less, and the molar ratio of the aqueous solution to the 1,1,3,3-tetramethyldisiloxane is in the range of 0.5 to 1.5. The method is particularly useful for manufacturing siloxane compounds having dimethylhydridosiloxy groups.

DESCRIPTION OF INVENTION

The present invention is a method for manufacturing a siloxane compound described by formula $R^1{}_m Si\{OSi(CH_3)_2 H\}_{(4-m)}$ comprising reacting a silane compound or condensation product of a silane compound described by formula $R^1{}_m Si(OR^2)_{(4-m)}$, where $R^1$ is selected from the groups consisting of hydrogen and substituted or unsubstituted monovalent hydrocarbon groups, $R^2$ is selected from hydrogen, alkyl groups and alkoxyalkyl groups, and m is an integer from 0 to 3, with 1,1,3,3-tetramethyldisiloxane in an aqueous solution of an acid in which the acid concentration is 1.0 wt % or less, and the molar ratio of the aqueous solution to the 1,1,3,3-tetramethyldisiloxane is in the range of 0.5 to 1.5.

Silane compounds or partial condensation products of silane compounds described by the formula $R^1{}_m Si(OR^2)_{(4-m)}$ constitute one of the raw materials used in the manufacturing method of the present invention. $R^1$ is a hydrogen atom or a substituted or unsubstituted monovalent hydrocarbon group. Examples of substituted or unsubstituted monovalent hydrocarbon groups which can be used include alkyl groups such as methyl groups, ethyl groups, propyl groups or butyl groups; alkenyl groups such as vinyl groups, allyl groups, butenyl groups, pentenyl groups or hexenyl groups; aryl groups such as phenyl groups, tolyl groups or xylyl groups; aralkyl groups such as benzyl groups or phenethyl groups; and substituted alkyl groups such as trifluoropropyl groups, glycidoxypropyl groups, epoxycyclohexylethyl groups, acryloxypropyl groups, methacryloxypropyl groups or mercaptopropyl groups. $R^2$ is a hydrogen atom, an alkyl group or an alkoxyalkyl group. Examples of alkyl groups which can be used include methyl groups, ethyl groups and propyl groups, and examples of alkoxyalkyl groups which can be used include methoxymethyl groups and methoxyethyl groups. Furthermore, m in the above formula is an integer from 0 to 3.

Examples of silane compounds or partial condensation products of the same include alkoxysilanes such as trimethylmethoxysilane, dimethyldimethoxysilane, methyltrimethoxysilane, tetramethoxysilane, trimethylethoxysilane, dimethyldiethoxysilane, methyltriethoxysilane, tetraethoxysilane, vinyldimethylmethoxysilane, vinylmethyldimethoxysilane, vinyltrimethoxysilane, phenyldimethylmethoxysilane, phenylmethyldimethoxysilane, phenyltrimethoxysilane, methacryloxypropyldimethylmethoxysilane, methacryloxypropylmethyldimethoxysilane, methacryloxypropyltrimethoxysilane, mercaptopropyldimethylmethoxysilane, mercaptopropylmethyldimethoxysilane and mercaptopropyltrimethoxysilane; and silane compounds in which some or all of the alkoxy groups or alkoxyalkoxy groups bonded to the silicon atoms of the alkoxysilanes are hydrolyzed; and partial condensation products in which the silane compounds have undergone a condensation reaction, but have not reached the point of gelation. These silane compounds or partial condensation products of the same may be used singly or in mixtures consisting of two or more compounds.

The 1,1,3,3-tetramethyldisiloxane is also one of the raw materials used in the manufacturing method of the present invention. In the manufacturing method of the present invention, the silane compounds or partial condensation products are reacted with 1,1,3,3-tetramethyldisiloxane in an aqueous solution of an acid. In regard to the molar ratio of the respective raw materials in this case, it is desirable that the amount of 1,1,3,3-tetramethyldisiloxane used be 0.5 moles or greater per mole of alkoxy groups, alkoxyalkoxy groups or hydroxy groups bonded to the silicon atoms of the silane compounds or partial condensation products in order to inhibit gelation caused by a condensation reaction of the silane compounds or partial condensation products with each other. Furthermore, an amount in the range of 0.5 to 1.0 moles is even more desirable, and an amount in the range of 0.5 to 0.75 moles is especially desirable.

When the silane compounds or partial condensation products are reacted with 1,1,3,3-tetramethyldisiloxane in an aqueous solution of an acid, the concentration of the acid contained in this aqueous solution should be 1.0 wt % or less. Preferably the acid concentration is 0.5 wt % or less. If the acid concentration exceeds these limits, side reactions are promoted so that the production rate of the siloxane compound which is the target product drops. Furthermore, it is necessary that the molar ratio of water to the disiloxane be in the range of 0.5 to 1.5, and this molar ratio is preferably in the range of 0.7 to 1.2. If the amount of water used is such that the molar ratio is less than the lower limit of the range, the production rate of the desired siloxane compound drops. On the other hand, if the amount of water used is such that the molar ratio exceeds the upper limit of the range, a gel is formed as a result of a condensation reaction of the silane compounds and partial condensation products with each other.

Examples of acids which can be used include protic acids such as hydrochloric acid, sulfuric acid, trifluoroacetic acid, trifluoromethanesulfonic acid, acetic acid and acrylic acid, and Lewis acids such as iron chloride, aluminum chloride, lead chloride and titanium chloride. From the standpoint of a favorable conversion rate in the reaction, hydrochloric acid or trifluoromethanesulfonic acid is desirable, and hydrochloric acid is especially desirable.

In the present method, the addition of an organic solvent is optional. Although the organic solvent does not participate directly in the reaction, diluting the reaction system improves the mixing of the aqueous phase and has the effect of improving the reaction rate. Examples of organic solvents include methanol, ethanol, isopropanol, acetone, methyl ethyl ketone, benzene, toluene and xylene.

In the present method the silane compounds or partial condensation products and the 1,1,3,3-tetramethyldisiloxane are reacted in an aqueous solution of an acid. It is desirable that the reaction temperature be in the range of 0 to 70° C., and a reaction temperature in the range of 20 to 30° C. is especially desirable. If the reaction temperature is lower than the lower limit of the range, the reaction tends to be retarded. On the other hand, if the reaction temperature exceeds the upper limit of the range, gelation caused by a condensation reaction of the silane compounds or partial condensation products with each other tend to be accelerated.

In the present method there are no particular restrictions on the method used to add the raw materials. For example, the acid or an aqueous solution of an acid may be added dropwise to a mixture consisting of the silane compounds or partial condensation products, the 1,1,3,3-tetramethyldisiloxane and water. The silane compounds or partial condensation products and the 1,1,3,3-tetramethyldisiloxane may be added dropwise to an aqueous solution of an acid, or the silane compounds or partial condensation products may be added dropwise to an aqueous solution of 1,1,3,3-tetramethyldisiloxane and an acid, may be used. From the standpoints of control of the heat of the reaction, ease of operation in the case of mass production, and selectivity of the reaction, the silane compounds or partial condensation products are added dropwise to an aqueous solution of 1,1,3,3-tetramethyldisiloxane and an acid is desirable.

In the present method invention, the silane compounds or partial condensation products and the 1,1,3,3-tetramethyldisiloxane are reacted in an aqueous solution of an acid, and when the reaction reaches a state of equilibrium, the reaction is stopped. Then the siloxane compounds described by formula $R^1_m Si\{OSi(CH_3)_2H\}_{(4-m)}$, which are the target products, may be removed a by conventional purification methods such as distillation. $R^1$ is a hydrogen atom or a substituted or unsubstituted monovalent hydrocarbon group and m is an integer from 0 to 3. Examples of monovalent hydrocarbon groups include those previously described. The reaction can be stopped by neutralizing the acid in the reaction system by means of a base such as an organic amine compound or ammonia. The acid is removed by washing the reaction system with water. Bases such as organic amine compounds and ammonia tend not to promote dehydrogenation type hydrolysis reactions of hydrogen atoms bonded to silicon atoms, and are therefore desirable as neutralizing agents for stopping the reaction.

After the silane compounds or partial condensation products and the 1,1,3,3-tetramethyldisiloxane are reacted in an aqueous solution of an acid, the reaction mixture obtained by stopping the reaction contains small amounts of precursors and by-products in addition to the desired product. Examples of such precursors are siloxane compounds described by formula $R^1_n Si(OR^2)_p \{OSi(CH_3)_2H\}_{4-(n+p)}$, where $R^1$ is selected from the group consisting of hydrogen and substituted or unsubstituted monovalent hydrocarbon group, $R^2$ is selected from the group consisting of hydrogen, alkyl groups and alkoxyalkyl groups, n is an integer from 0 to 2, p is an integer from 1 to 3, and n+p is an integer from 1 to 3. Examples of by-products include siloxane compounds described by formula $R^1_q Si\{OSi(CH_3)_2 OSi(CH_3)_2 OSi(CH_3)_2H\}_r\{OSi(CH_3)_2H\}_{4-(q+r)}$, where $R^1$ is selected from the group consisting of hydrogen and substituted or unsubstituted monovalent hydrocarbon groups, q is an integer from 0 to 3, r is an integer from 1 to 4, and q+r is an integer from 1 to 4. This is the result from a dehydrogenation type condensation reaction of the target product or the precursor 1,1,3,3-tetramethyldisiloxane.

Precursors may be further converted to the target product by reacting these precursors with 1,1,3,3-tetramethyldisiloxane in an aqueous solution of an acid. The following method may be used, for example, after an organic amine or ammonia in excess of the neutralization equivalent is added to the equilibrium mixture, reaction by-product alcohols are removed from the reaction mixture by heating at standard pressure or under reduced pressure. Then, an aqueous solution of an acid in excess of the neutralization equivalent of the organic amine or ammonia remaining in the reaction system is added along with 1,1,3,3-tetramethyldisiloxane, and these ingredients are agitated and mixed. After the reaction system reaches a state of equilibrium under acidic conditions, the reaction is stopped by adding an organic amine or ammonia in excess of the neutralization equivalent of the acid remaining in the reaction system. Next, the aqueous phase is separated and removed, and the target product is obtained from the organic phase by a conventional purification method such as distillation.

The siloxane compounds described by formula $R^1_m Si\{OSi(CH_3)_2H\}_{(4-m)}$, where $R^1$ is selected from the group consisting of hydrogen and substituted or unsubstituted monovalent hydrocarbon groups, and m is an integer from 0 to 3, are useful as resin modifying agents, as various types of cross-linking agents, and as raw materials for silicone dendrimers.

The following examples are provided to illustrate the present invention. These examples are not intended to limit the scope of the claims herein.

EXAMPLE 1

1,1,3,3-tetramethyldisiloxane (2077 g, 15.5 moles), 291.8 g of a 0.015 wt % aqueous solution of hydrochloric acid with a molar ratio of water to disiloxane of 1.0 and 99.5 g of isopropanol were placed in a 5-liter four-necked flask equipped with an agitator, and this mixture was agitated for 3 hours under ice water cooling. Then methyltrimethoxysilane (1276 g, 9.4 moles) was added dropwise to this reaction mixture, and the temperature of the reaction mixture rose to 27° C. Progress of the reaction was observed by gas chromatographic analysis (GLC) while this reaction mixture was agitated at 26° C. The reaction mixture reached a equilibrium state in 30 minutes. The GLC peak area ratio of the target product methyltrisdimethylsiloxysilane described by formula $CH_3Si\{OSi(CH_3)_2H\}_3$, was 44%, and the respective peak area ratios of the precursor methyldimethoxydimethylsiloxysilane described by formula $CH_3Si(OCH_3)_2\{OSi(CH_3)_2H\}$, the precursor methylmethoxybisdimethylsiloxysilane described by formula $CH_3Si(OCH_3)\{OSi(CH_3)_2H\}_2$, the by-product 3,5-bisdimethylsiloxy-1,1,3,5,7,7-hexamethyltetrasiloxane described by formula $\{(CH_3)_2HSiO\}_2Si(CH_3)OSi(CH_3)\{OSi(CH_3)_2H\}_2$, and the by-product 3-dimethylsiloxy-1,1,3,5,5,7,7-heptamethyltetrasiloxane described by formula $\{(CH_3)SiOSi(CH_3)_2H\}_2\{OSi(CH_3)_2OSi(CH_3)_2H\}$ were as follows:
methyltrisdimethylsiloxysilane/
  methyldimethoxydimethylsiloxysilane=24.3,
methyltrisdimethylsiloxysilane/
  methylmethoxybisdimethylsiloxysilane=10.6, and
methyltrisdimethylsiloxysilane/3,5-bisdimethylsiloxy-1,1,3,5,7,7-hexamethyltetrasiloxane=23.5.

Next, 0.102 g (1.70 millimoles) of aqueous ammonia was added to this reaction mixture so that the hydrochloric acid was neutralized. The reaction mixture was heated to 70° C., and the methanol produced as a by-product was distilled away. Next, this reaction mixture was cooled using water to 25° C., and 752 g (5.6 moles) of 1,1,3,3-tetramethyldisiloxane and 165.9 g of a 0.08 wt % aqueous solution of hydrochloric acid were added to the reaction mixture, and the resulting mixture was agitated at room temperature. Analysis by GLC after 6.5 hours indicated the peak area ratio of methyltrisdimethylsiloxysilane was 69.5%, and the respective peak area ratios of the precursor methyldimethoxydimethylsiloxysilane, precursor methylmethoxybisdimethylsiloxysilane, by-product 3,5-bisdimethylsiloxy-1,1,3,5,7,7-hexamethyltetrasiloxane and by-product 3-dimethylsiloxy-1,1,3,5,5,7,7-heptamethyltetrasiloxane were as follows:
methyltrisdimethylsiloxysilane/
  methyldimethoxydimethylsiloxysilane=289,
methyltrisdimethylsiloxysilane/
  methylmethoxybisdimethylsiloxysilane=42.0,
methyltrisdimethylsiloxysilane/3,5-bisdimethylsiloxy-1,1,3,5,7,7-hexamethyltetrasiloxan=21.1 and
methyltrisdimethylsiloxysilane/3-dimethylsiloxy-1,1,3,5,5,7,7-heptamethyltetrasiloxane=701.

Aqueous ammonia (0.48 g, 8.3 millimoles) was added to this reaction mixture so that the hydrochloric acid was neutralized. The reaction mixture was allowed to stand so that a phase separation occurred, and the lower layer was separated out. The upper layer was subjected to vacuum distillation, thus producing 2026 g of an 89–96° C./70 mmHg fraction. Analysis of this fraction by GLC indicated that this fraction consisted of 95.8% methyltrisdimethylsiloxysilane, 0.53% precursor methyldimethoxydimethylsiloxysilane, 2.1% precursor methylmethoxybisdimethylsiloxysilane and 0.1% by-product 3-dimethylsiloxy-1,1,3,5,5,7,7-heptamethyltetrasiloxane and the yield=77%, and still efficiency=39%.

EXAMPLE 2

1,1,3,3-tetramethyldisiloxane (930.2 g, 6.9 moles), 95.7 g of a 0.015 wt % aqueous solution of hydrochloric acid with a molar ratio of water to the disiloxane of 0.8, and 32.7 g of isopropanol were placed in a 2-liter four-necked flask equipped with an agitator, and this mixture was agitated for 3 hours under water cooling. Next, 419 g (3.1 moles) of methyltrimethoxysilane was added dropwise to this reaction mixture, and the temperature of the reaction mixture rose to 27° C. The progress of the reaction was observed by GLC while this reaction mixture was agitated at 25° C. It was determined that the reaction mixture reached equilibrium state in 2 hours. The peak GLC area ratio of the target methyltrisdimethylsiloxysilane was 38%, and the respective peak area ratios of the methyldimethoxydimethylsiloxysilane, precursor methylmethoxybisdimethylsiloxysilane, by-product 3,5-bisdimethylsiloxy-1,1,3,5,7,7-hexamethyltetrasiloxane and by-product 3-dimethylsiloxy-1,1,3,5,5,7,7-heptamethyltetrasiloxane were as follows:
methyltrisdimethylsiloxysilane/
  methyldimethoxydimethylsiloxysilane=51.7,
methyltrisdimethylsiloxysilane/
  methylmethoxybisdimethylsiloxysilane=17.2,
methyltrisdimethylsiloxysilane/3,5-bisdimethylsiloxy-1,1,3,5,7,7-hexamethyltetrasiloxane=19.2, and
methyltrisdimethylsiloxysilane/3-dimethylsiloxy-1,1,3,5,5,7,7-heptamethyltetrasiloxane=437.

Next, 0.047 g (0.8 millimoles) of aqueous ammonia was added to this reaction mixture so that the hydrochloric acid was neutralized. This reaction mixture was subjected to vacuum distillation, thus producing 442 g of an 89–95° C./70 mmHg fraction. The fraction was analyzed by GLC and GC-MS and determined to consist of 94.7% target methyltrisdimethylsiloxysilane, 2.6% precursor methyldimethoxydimethylsiloxysilane, 2.4% precursor methylmethoxybisdimethylsiloxysilane and 0.2% by-product 3-dimethylsiloxy-1,1,3,5,5,7,7-heptamethyltetrasiloxane and the yield=54%, and still efficiency=22%.

EXAMPLE 3

An aqueous solution of hydrochloric acid (2.43 g of a 0.03 wt %) with a molar ratio of water to 1,1,3,3-disiloxane of 0.8, and 0.78 g of isopropanol were placed in a 200-milliliter four-necked flask equipped with an agitator. Under water cooling and agitation, a mixture of 22.2 g (165.4 millimoles) of 1,1,2,2-tetramethyldisiloxane and 10 g (73.5 millimoles) of methyltrimethoxysilane was added dropwise over a period of 25 minutes. The temperature of this reaction mixture rose to 27° C. The progress of the reaction was observed by GLC while this reaction mixture was agitated at 25° C. It was determined that the reaction mixture reached equilibrium state in 1 hour. The peak GLC area ratio of the target product methyltrisdimethylsiloxysilane was 38%, and the respective peak area ratios of methyldimethoxydimethylsiloxysilane, precursor methylmethoxybisdimethylsiloxysilane, by-product 3,5-bisdimethylsiloxy-1,1,3,5,7,7-hexamethyltetrasiloxane, and by-product 3-dimethylsiloxy-1,1,3,5,5,7,7-heptamethyltetrasiloxane were as follows:
methyltrisdimethylsiloxysilane/
  methyidimethoxydimethylsiloxysilane=53.3,
methyltrisdimethylsiloxysilane/
  methylmethoxybisdimethylsiloxysilane=17.7,
methyltrisdimethylsiloxysilane/3,5-bisdimethylsiloxy-1,1,3,5,7,7-hexamethyltetrasiloxane=19.2, and methyltrisdimethylsiloxysilane/3-dimethylsiloxy-1,1,3,5,
5,7,7-heptamethyltetrasiloxane=388.

EXAMPLE 4

An aqueous solution of hydrochloric acid (2.43 g of a 0.03 wt %) with a molar ratio of water to 1,1,3,3-tetramethyldisiloxane of 0.8, and 0.78 g of isopropanol, 22.2 g (165.4 millimoles) of 1,1,3,3-tetramethyldisiloxane and 10 g (73.5 millimoles) of methyltrimethoxysilane were placed in a 200-milliliter four-necked flask equipped with an agitator, and this mixture was agitated at room temperature. This mixture showed violent exothermy, and the temperature rose to 38° C. This reaction mixture was agitated for 1 hour under air cooling. Analysis by GLC indicated the peak area ratio of the target product methyltrisdimethylsiloxysilane was 32%, and the respective peak area ratios of the precursor methyldimethoxydimethylsiloxysilane, precursor methylmethoxybisdimethylsiloxysilane, by-product 3,5-bisdimethylsiloxy-1,1,3,5,7,7-hexamethyltetrasiloxane and by-product 3-dimethylsiloxy-1,1,3,5,5,7,7-heptamethyltetrasiloxane were as follows:
methyltrisdimethylsiloxysilane/
methyldimethoxydimethylsiloxysilane=52.0,
methyltrisdimethylsiloxysilane/
methylmethoxybisdimethylsiloxysilane=19.8,
methyltrisdimethylsiloxysilane/3,5-bisdimethylsiloxy-1,1,3,
5,7,7-hexamethyltetrasiloxane=5.5, and
methyltrisdimethylsiloxysilane/3-dimethylsiloxy-1,1,3,5,
5,7,7-heptamethyltetrasiloxane=208.

EXAMPLE 5

An aqueous solution of hydrochloric acid (2.25 g of a 0.08 wt %) with a molar ratio of water to 1,1,3,3-tetramethyldisiloxane of 0.8, and 22.2 g (165.4 millimoles) of 1,1,3,3-tetramethyldisiloxane and 10 g (73.5 millimoles) of methyltrimethoxysilane were placed in a 200-milliliter four-necked flask equipped with an agitator, and this mixture was agitated at room temperature. This mixture showed violent exothermy, and the temperature rose to 37° C. This reaction mixture was agitated for 0.5 hours under air cooling. Analysis by GLC indicated the peak area ratio of the target product methyltrisdimethylsiloxysilane was 28%, and the respective peak area ratios of the precursor methyldimethoxydimethylsiloxysilane, precursor methylmethoxybisdimethylsiloxysilane, by-product 3,5-bisdimethylsiloxy-1,1,3,5,7,7-hexamethyltetrasiloxane and by-product 3-dimethylsiloxy-1,1,3,5,5,7,7-heptamethyltetrasiloxane were as follows:
methyltrisdimethylsiloxysilane/
methyldimethoxydimethylsiloxysilane=58.7,
methyltrisdimethylsiloxysilane/
methylmethoxybisdimethylsiloxysilane=11.7,
methyltrisdimethylsiloxysilane/3,5-bisdimethylsiloxy-1,1,3,
5,7,7-hexamethyltetrasiloxane=6.5, and
methyltrisdimethylsiloxysilane/3-dimethylsiloxy-1,1,3,5,
5,7,7-heptamethyltetrasiloxane432.

EXAMPLE 6

An aqueous solution of hydrochloric acid (2.25 g of a 0.8 wt %) with a molar ratio of water to 1,1,3,3-tetramethyldisiloxane of 0.8, and 22.2 g (165.4 millimoles) of 1,1,3,3-tetramethyldisiloxane and 10 g (73.5 millimoles) of methyltrimethoxysilane were placed in a 200-milliliter four-necked flask equipped with an agitator, and this mixture was agitated at room temperature. This mixture showed violent exothermy, and the temperature rose to 37° C. This reaction mixture was agitated for 2 hours under air cooling. Analysis by GLC indicated the peak area ratio of the target product methyltrisdimethylsiloxysilane was 28.5%, and the respective peak area ratios of the precursor methyldimethoxydimethylsiloxysilane, precursor methylmethoxybisdimethylsiloxysilane, by-product 3,5-bisdimethylsiloxy-1,1,3,5,7,7-hexamethyltetrasiloxane and by-product 3-dimethylsiloxy-1,1,3,5,5,7,7-heptamethyltetrasiloxane were as follows:
methyltrisdimethylsiloxysilane/
methyldimethoxydimethylsiloxysilane=52.9,
methyltrisdimethylsiloxysilane/
methylmethoxybisdimethylsiloxysilane=15.0,
methyltrisdimethylsiloxysilane/3,5-bisdimethylsiloxy-1,1,3,
5,7,7-hexamethyltetrasiloxane=4.5, and
methyltrisdimethylsiloxysilane/3-dimethylsiloxy-1,1,3,5,
5,7,7-heptamethyltetrasiloxane=203.

EXAMPLE 7

22.2 g (165.4 millimoles) of 1,1,3,3-tetramethyldisiloxane, 2.61 g of a 0.05 wt % aqueous solution of trifluoromethanesulfonic acid with a molar ratio of water disiloxane of 0.9, and 0.78 g of isopropanol were placed in a 200-milliliter four-necked flask equipped with an agitator, and 10 g (73.5 millimoles) of methyltrimethoxysilane was added dropwise over a period of 27 minutes under air cooling and agitation. The temperature of this reaction mixture rose to 31° C. Progress of the reaction was observed by GLC while this reaction mixture was agitated at 31° C. It was determined that the reaction mixture reached equilibrium state in 3 hours. The peak GLC area ratio of the target product methyltrisdimethylsiloxysilane was 29%, and the respective peak area ratios of the precursor methyldimethoxydimethylsiloxysilane, precursor methylmethoxybisdimethylsiloxysilane, by-product 3,5-bisdimethylsiloxy-1,1,3,5,7,7-hexamethyltetrasiloxane and by-product 3-dimethylsiloxy-1,1,3,5,5,7,7-heptamethyltetrasiloxane were as follows:
methyltrisdimethylsiloxysilane/
methyldimethoxydimethylsiloxysilane=55.2,
methyltrisdimethylsiloxysilane/
methylmethoxybisdimethylsiloxysilane=7.8,
methyltrisdimethylsiloxysilane/3,5-bisdimethylsiloxy-1,1,3,
5,7,7-hexamethyltetrasiloxane=6.1, and
methyltrisdimethylsiloxysilane/3-dimethylsiloxy-1,1,3,5,
5,7,7-heptamethyltetrasiloxane=266.

EXAMPLE 8

16.2 g (121.2 millimoles) of 1,1,3,3-tetramethyldisiloxane, 2.43 g of a 0.03 wt % aqueous solution of hydrochloric acid with a molar ratio of water to the disiloxane of 1.1, and 0.78 g of isopropyl alcohol were placed in a 200-milliliter four-necked flask equipped with an agitator, and 8.4 g (55.1 millimoles) of tetramethoxysilane was added dropwise over a period of 70 minutes under air cooling and agitation. The temperature of this reaction mixture rose to 26° C. Progress of the reaction was observed by GLC while this reaction mixture was agitated at 22° C. It was determined that the reaction mixture reached equilibrium state in 2 hours. The peak GLC area ratio of the target product tetrakisdimethylsiloxysilane described by formula $Si\{OSi(CH_3)_2H\}_4$, was 42%, and the respective peak area ratios of the precursor dimethoxybisdimethylsiloxysilane described by formula $Si(OCH_3)_2\{OSi(CH_3)_2H\}_2$, the precursor methoxytrisdiemthylsiloxysilane described by the formula $Si(OCH_3)\{OSi(CH_3)_2H\}_3$, and the by-product 3,3, 5,5-tetrakisdimethylsiloxy-1,1,7,7-tetramethyltetrasiloxane described by formula $\{(CH_3)_2HSiO\}_3SiOSi\{OSi(CH_3)_2H\}_3$, were as follows:

tetrakisdimethylsiloxysilane/
   dimethoxybisdimethylsiloxysilane=161,
tetrakisdimethylsiloxysilane/
   methoxytrisdiemthylsiloxysilane=8.5, and
tetrakisdimethylsiloxysilane/3,3,5,5-tetrakisdimethylsiloxy-1,1,7,7-tetramethyltetrasiloxane=21.1.

Next, aqueous ammonia (0.0008 g, 0.014 millimoles) was added to this reaction mixture so that the hydrochloric acid was neutralized. The reaction mixture was heated to 70° C., and the methanol produced as a by-product was distilled away. Next, this reaction mixture was cooled by water to 25° C. 1,1,3,3-tetramethyldisiloxane (5.9 g, 44.1 millimoles), and 1.46 g of a 0.11 wt % aqueous solution of hydrochloric acid were added to the reaction mixture, and the resulting mixture was agitated at room temperature overnight. Analysis by GLC indicated a peak area ratio of the target product tetrakisdimethylsiloxysilane was 64%, the peak of the precursor dimethoxybisdimethylsiloxysilane had disappeared, and the respective peak area ratios of the precursor methoxytrisdiemthylsiloxysilane and by-product 3,3,5,5-tetrakisdimethylsiloxy-1,1,7,7-tetramethyltetrasiloxane were as follows:

tetrakisdimethylsiloxysilane/
   methoxytrisdiemthylsiloxysilane=37.7, and
tetrakisdimethylsiloxysilane/3,3,5,5-tetrakisdimethylsiloxy-1,1,7,7-tetramethyltetrasiloxane=10.1.

EXAMPLE 9

1,1,3,3-tetramethyldisiloxane (16.2 g, 121.2 millimoles), and 2.43 g of a 0.03 wt % aqueous solution of hydrochloric acid with a molar ratio of water to the disiloxane of 1.1 and 0.78 g of isopropyl alcohol were placed in a 200-milliliter four-necked flask equipped with an agitator, and 10.9 g (73.5 millimoles) of vinyltrimethoxysilane was added dropwise over a 90 minute period under air cooling and agitation. The temperature of this reaction mixture rose to 26° C. Progress of the reaction was observed by GLC while this reaction mixture was agitated at 23° C. It was determined that the reaction mixture reached equilibrium state in 0.5 hours. The peak GLC area ratio of the target product vinyltrisdimethylsiloxysilane described by formula $CH_2=CHSi\{OSi(CH_3)_2H\}_3$, was 48%, and the respective peak area ratios of the precursor vinylmethoxybisdimethylsiloxysilane described by formula $CH_2=CHSi(OCH_3)\{OSi(CH_3)_2H\}_2$ and the by-product 3,5-divinyl-3,5-bisdimethylsiloxy-1,1,7,7-tetramethyl-tetrasiloxane described by formula $\{(CH_3)_2HSiO\}_2(CH_2=CH)SiOSi(CH_2=CH)\{OSi(CH_3)_2H\}_2$, were as follows:

vinyltrisdimethylsiloxysilane/
   vinylmethoxybisdimethylsiloxysilane=11.0, and
vinyltrisdimethylsiloxysilane/3,5-divinyl-3,5-bisdimethylsiloxy-1,1,7,7-tetramethyl-tetrasiloxane=26.8.

Next, aqueous ammonia (0.002 g, 0.035 millimoles) was added to this reaction mixture so that the hydrochloric acid was neutralized. The reaction mixture was heated to 70° C., and the methanol produced as a by-product was distilled away. Next, this reaction mixture was cooled by water to 25° C. Next, 5.9 g (44.1 millimoles) of 1,1,3,3-tetramethyldisiloxane and 1.69 g of a 0.14 wt % aqueous solution of hydrochloric acid were added to the reaction mixture, and the resulting mixture was agitated at room temperature overnight. Analysis by GLC indicated a peak area ratio of the target product vinyltrisdimethylsiloxysilane was 71%, and the respective peak area ratios of the precursor vinylmethoxybisdimethylsiloxysilane and by-product 3,5-divinyl-3,5-bisdimethylsiloxy-1,1,7,7-tetramethyl-tetrasiloxane were as follows:

vinyltrisdimethylsiloxysilane/
   vinylmethoxybisdimethylsiloxysilane=82.7, and
vinyltrisdimethylsiloxysilane/3,5-divinyl-3,5-bisdimethylsiloxy-1,1,7,7-tetramethyl-tetrasiloxane=20.4.

EXAMPLE 10

1,1,3,3-tetramethyldisiloxane (16.2 g, 121.2 millimoles), and 2.43 g of a 0 03 wt % aqueous solution of hydrochloric acid with a molar ratio of water to disiloxane of 1.1, and 0.78 g of isopropanol were placed in a 200-milliliter four-necked flask equipped with an agitator, and 14.4 g (73.5 millimoles) of mercaptopropyltrimethoxysilane was added dropwise over a period of 60 minutes under air cooling and agitation. The temperature of this reaction mixture rose to 27° C. Progress of the reaction was observed by GLC while this reaction mixture was agitated at 25° C. It was determined that the reaction mixture reached equilibrium state in 2 hours. The peak area GLC ratio of the target product mercaptopropyltrisdimethylsiloxysilane described by formula $HSCH_2CH_2CH_2Si\{OSi(CH_3)_2H\}_3$, was 52%, and the respective peak area ratios of the precursor mercaptopropylmethoxybisdimethylsiloxysilane described by formula $HSCH_2CH_2CH_2Si(OCH_3)\{OSi(CH_3)_2H\}_2$, and the by-product 3,5-dimercaptopropyl-3,5-bisdimethylsiloxy-1,1,7,7-tetramethyltetrasiloxane described by formula $\{CH_3\}_2HSiO\}_2(HSCH_2CH_2CH_2)SiOSi(CH_2CH_2CH_2SH)\{OSi(CH_3)_2H\}_3$, were as follows:

mercaptopropyltrisdimethylsiloxysilane/
   mercaptopropylmethoxybisdimethylsiloxysilane=11.2, and mercaptopropyltrisdimethylsiloxysilane/3,5-dimercaptopropyl-3,5-bisdimethylsiloxy-1,1,7,7-tetramethyltetrasiloxane=60.7.

Next, 0.0025 g (0.035 millimoles) of diethylamine was added to this reaction mixture so that the hydrochloric acid was neutralized. This reaction mixture was heated to 70° C., and the methanol produced as a by-product was distilled away. Next, this reaction mixture was cooled by water to 25° C., and 5.9 g (44.1 millimoles) of 1,1,3,3-tetramethyldisiloxane and 1.69 g of a 0.15 wt % aqueous solution of hydrochloric acid were added to the reaction mixture. The resulting mixture was agitated at room temperature overnight. Analysis by GLC indicated the peak area ratio of the target product mercaptopropyltrisdimethylsiloxysilane was 71%, and the respective peak area ratios of the precursor mercaptopropylmethoxybisdimethylsiloxysilane and by-product 3,5-dimercaptopropyl-3,5-bisdimethylsiloxy-1,1,7,7-tetramethyltetrasiloxane were as follows:

mercaptopropyltrisdimethylsiloxysilane/
   mercaptopropylmethoxybisdimethylsiloxysilane=41.3, and mercaptopropyltrisdimethylsiloxysilane/3,5-dimercaptopropyl-3,5-bisdimethylsiloxy-1,1,7,7-tetramethyltetrasiloxane=51.7.

EXAMPLE 11

1,1,3,3-tetramethyldisiloxane (739.3 g, 5.5 moles) of, 2352 g of a 13.5 wt % aqueous solution of hydrochloric acid with a molar ratio of water to disiloxane of 20.5, and 1162 g of isopropanol were placed in a 5-liter four-necked flask equipped with an agitator, and 332.4 g (2.4 moles) of methyltrimethoxysilane was added dropwise at 10 to 15° C.

under ice water cooling and agitation. Following the completion of this dropwise addition, this reaction mixture was agitated for 4 hours at 10° C. under ice water cooling. The reaction mixture was allowed to stand quietly so that a phase separation occurred, and the aqueous phase was separated out and removed. Washing was performed twice with a saturated aqueous solution of sodium hydrogencarbonate, and then once with tap water. The organic layer obtained by separating and removing the aqueous layer was dried by adding sodium sulfate and then the sodium sulfate was removed and a distillation was performed, thus producing 490.3 g of a 161 to 165° C. fraction. Analysis by GLC and GC-MS indicated that this fraction was a mixture consisting of 96.4% target product methyltrisdimethylsiloxysilane, 0.17% precursor methyldimethoxydimethylsiloxysilane, 0.29% precursor methylmethoxybisdimethylsiloxysilane and 1.5% by-product 3,5-bisdimethylsiloxy-1,1,3,5,7,7-hexamethyltetrasiloxane (yield: 75%, still efficiency: 9.8%).

EXAMPLE 12

1,1,3,3-tetramethyldisiloxane (1061 g, 7.9 moles), and 1224 g of a 6.0 wt % aqueous solution of hydrochloric acid with a molar ratio of water to disiloxane of 8.1 and 1632 g of isopropanol were placed in a 5-liter four-necked flask equipped with an agitator, and 673 g (4.9 moles) of methyltrimethoxysilane was added dropwise at 7 to 25° C. under ice water cooling and agitation. Following the completion of this dropwise addition, this reaction mixture was agitated for 4 hours at 25° C. under water cooling. The reaction mixture was allowed to stand so that a phase separation occurred, and the upper layer was analyzed by GLC. The peak area ratio of the target product methyltrisdimethylsiloxysilane in GLC was 45%, and the respective peak area ratios of by-product 3-dimethylsiloxy-1,1,3,5,5,7,7-heptamethyltetrasiloxane and the by-product 5-dimethylsiloxy-1,1,3,3,5,7,7,9,9-nonamethylpentasiloxane described by formula $CH_3Si\{OSi(CH_3)_2H\}\{OSi(CH_3)_2OSi(CH_3)_2H\}_2$, were as follows:

methyltrisdimethylsiloxysilane/3-dimethylsiloxy-1,1,3,5,5,7,7-heptamethyltetrasiloxane=1.3, and methyltrisdimethylsiloxysilane/5-dimethylsiloxy-1,1,3,3,5,7,7,9,9-nonamethylpentasiloxane=12.9.

I claim:

1. A method for manufacturing a siloxane compound described by formula $R^1_m Si\{OSi(CH_3)_2H\}_{(4-m)}$ comprising reacting a silane compound or condensation product of a silane compound described by formula $R^1_m Si(OR^2)_{(4-m)}$ where $R^1$ is selected from the group consisting hydrogen and substituted or unsubstituted monovalent hydrocarbon groups, $R^2$ is selected from the group consisting of hydrogen, alkyl groups, and alkoxyalkyl groups, and m is an integer from 0 to 3, with 1,1,3,3-tetramethyldisiloxane in an aqueous solution of an acid in which the acid concentration is 1.0 wt % or less, and the molar ratio of the water in the aqueous solution to the 1,1,3,3-tetramethyldisiloxane is in the range of 0.5 to 1.5.

2. A method according to claim 1, where the aqueous solution of the acid comprises an aqueous solution of hydrochloric acid.

3. A method according to claim 1, where the reacting is conducted in a temperature range of 0° C. to about 70° C.

4. A method according to claim 1, where the reacting is conducted in a temperature range of 20° C. to about 30° C.

5. A method according to claim 1, where the amount of 1,1,3,3-tetramethyldisiloxane used is 0.5 moles or greater per mole of alkoxy groups, alkoxyalkoxy groups or hydroxy groups bonded to the silicon atoms of the silane compounds or partial condensation products.

6. A method according to claim 1, where the amount of 1,1,3,3-tetramethyldisiloxane used be 0.5 moles to 1.0 moles of alkoxy groups, alkoxyalkoxy groups or hydroxy groups bonded to the silicon atoms of the silane compounds or partial condensation products.

7. A method according to claim 1, where the amount of 1,1,3,3-tetramethyldisiloxane used be 0.5 moles to 0.75 moles of alkoxy groups, alkoxyalkoxy groups or hydroxy groups bonded to the silicon atoms of the silane compounds or partial condensation products.

8. A method according to claim 1, where the 1,1,3,3-tetramethyldisiloxane in an aqueous solution of an acid in which the acid concentration is 0.5 wt % or less.

9. A method according to claim 1, where the aqueous solution has a molar ratio of water to the 1,1,3,3-tetramethyldisiloxane in the range of 0.7 to 1.2.

10. A method according to claim 1, where the aqueous solution of the acid comprises an aqueous solution of trifluoromethanesulfonic acid.

* * * * *